United States Patent
Bedard et al.

[11] Patent Number: 6,007,790
[45] Date of Patent: Dec. 28, 1999

[54] FAMILY OF MICROPOROUS INDIUM SILICATE COMPOSITIONS

[75] Inventors: Robert L. Bedard, McHenry; Lisa M. King, Crystal Lake; David S. Bem, Arlington Heights; Jana L. Gisselquist, Chicago; Susan C. Koster, South Elgin, all of Ill.

[73] Assignee: UOP LLC, Des Plaines, Ill.

[21] Appl. No.: 09/133,541

[22] Filed: Aug. 13, 1998

[51] Int. Cl.⁶ .............. C01B 33/20; C01B 39/02
[52] U.S. Cl. .......... 423/713; 423/718; 423/115; 423/326; 423/624
[58] Field of Search ................... 423/700, 713, 423/115, 326, 624, 718

[56] References Cited

U.S. PATENT DOCUMENTS

| | | | |
|---|---|---|---|
| 4,830,729 | 5/1989 | Dessau et al. | |
| 5,173,382 | 12/1992 | Hellring et al. | 423/713 |
| 5,174,980 | 12/1992 | Hellring et al. | 423/706 |
| 5,208,006 | 5/1993 | Kuznicki et al. | 423/713 |
| 5,399,337 | 3/1995 | Scmitt et al. | 423/709 |

FOREIGN PATENT DOCUMENTS

| | | |
|---|---|---|
| 74651 | 3/1983 | European Pat. Off. |
| 74652 | 3/1983 | European Pat. Off. |
| 2033358 | 5/1980 | United Kingdom. |

OTHER PUBLICATIONS

T. Gaewdang et al., *Z. Anorg. Allg. Chem.* 620 (1994) 1965–1970 (No Month).

A.N. Christensen and R.G. Hazell, *Acta Chemica Scandinavica* 21 (1967) 1425–1429 (No Month).

S. Bukeikhanova et al., *Catalysis Letters* 50 (1998) 93–105 (No Month).

M. Chatterjee et al., *microporous and Mesoporous Materials* 20 (1998) 87–91 (No Month).

*Primary Examiner*—Mark L. Bell
*Assistant Examiner*—David Sample
*Attorney, Agent, or Firm*—Thomas K. McBride; Frank S. Molinaro

[57] ABSTRACT

A new family of crystalline and microporous compositions having indium and silicon as essential framework elements have been synthesized. These compositions are characterized by unique x-ray diffraction patterns and an empirical formula of:

$$A_p(In_{1-n}M_n)_y Si_{1-z}Ge_z O_x$$

where A is a cation such as sodium or potassium and M is a metal having a valence of +3, +4 or +5 such as iron (+3), titanium (+4) and niobium (+5).

19 Claims, No Drawings

FAMILY OF MICROPOROUS INDIUM SILICATE COMPOSITIONS

FIELD OF THE INVENTION

This invention relates to a new family of microporous compositions having at least silicon and indium as framework elements. The composition is represented by the empirical formula:

$$A_p(In_{1-n}M_n)_ySi_{1-z}Ge_zO_x$$

BACKGROUND OF THE INVENTION

The number of microporous crystalline compositions number well in the hundreds. These range from zeolites which are crystalline aluminosilicate compositions to metal sulfide molecular sieves (see U.S. Pat. No. 4,880,761). In general, the crystalline zeolites are formed from corner-sharing $AlO_2$ and $SiO_2$ tetrahedra and are characterized by having pore openings of uniform dimensions, having a significant ion-exchange capacity, and being capable of reversibly desorbing an adsorbed phase which is dispersed throughout the internal voids of the crystal, without significantly displacing any atoms which make up the permanent crystal structure.

Non-zeolite molecular sieves are those which do not contain both $AlO_2$ and $SiO_2$ tetrahedra as essential framework constituents, but which exhibit the ion-exchange and/or adsorption characteristics of the zeolites. These include: 1) crystalline aluminophosphate compositions disclosed in U.S. Pat. No. 4,310,440; 2) silicon substituted aluminophosphates as disclosed in U.S. Pat. No. 4,440,871; 3) metal substituted aluminophosphates as disclosed in U.S. Pat. No. 4,853,197; and 4) metallo zinc-phosphate compositions disclosed in U.S. Pat. No. 5,302,362.

Applicants have now synthesized a new family of crystalline microporous compositions which have indium and silicon as the framework elements. These compositions can be described by the empirical formula:

$$A_p(In_{1-n}M_n)_ySi_{1-z}Ge_zO_x$$

where A is a cation selected from the group consisting of alkali metals, alkaline earth metal, ammonium ion, hydronium ion and mixtures thereof, "p" is the mole fraction of A and varies from about 0.5y to about 3y, M is an element having a valence of +3, +4 or +5, "n" is the mole fraction of M and varies from 0 to about 0.9, "x" has a value from about 2+y to about 2+5y, "y" has a value of about 0.25 to about 1 and "z" has a value from 0 to about 0.9.

Although indium silicates are known in the art, to applicants' knowledge there is no disclosure of crystalline and microporous indium silicates as described above. For example, T. Gaewdang et al. in *Z. Anorg. Allg. Chem.* 620 (1994) 1965–1970 describe indium silicates and indium germanates with crystal structures similar to thortveitite which is a dense phase composition. A. N. Christensen and R. G. Hazell in *Acta Chemica Scandinavica* 21 (1967) 1425– 1429 disclose that a composition with the formula $NaIn(SiO_3)_2$ has the diopside structure, also a dense phase. Bukeikhanovie et al. in *Catalysis Letters* 50 (1998) 93–105 disclose an amorphous indium silicate which is microporous. Finally, Chatterjee et al. in *Microporous and Mesoporous Materials,* 20 (1998) 87–91 disclose the synthesis of a zeolite beta containing indium. The ratio of $SiO_2/In_2O_3$ is 40 or higher. In contrast, applicants' compositions have a Si/In ratio from 4:1 to 1:1 in non M-containing compositions. Further, applicants' compositions differ from the other references in that they are both crystalline and microporous.

SUMMARY OF THE INVENTION

As stated, this invention relates to a new family of crystalline microporous compositions and a method of preparing the compositions. Accordingly, one embodiment of the invention is a crystalline microporous composition having a three dimensional framework structure of at least silicon tetrahedral oxide units and indium oxide units and having an empirical formula on an anhydrous basis of:

$$A_p(In_{1-n}M_n)_ySi_{1-z}Ge_zO_x$$

where A is a cation selected from the group consisting of alkali metals, alkaline earth metals, ammonium ion, hydronium ion and mixtures thereof, "p" is the mole fraction of A and varies from about 0.5y to about 3y, M is an element having a valence of +3, +4 or +5, "n" is the mole fraction of M and varies from 0 to about 0.9, "x" has a value from about 2+y to about 2+5y, "y" has a value of about 0.25 to about 1 and "z" has a value from 0 to about 0.9.

Another embodiment of the invention is a process for preparing the composition described above, the process comprising forming a reaction mixture containing reactive sources of A, indium, silicon, optionally germanium and optionally M, at a temperature and a time sufficient to form the crystalline composition, the mixture having a composition expressed in terms of mole ratios of oxides of:

$$aA_2O:bMO_{g/2}:1-bInO_{1.5}:cSiO_2:dGeO_2:eH_2O$$

where "a" has a value from about 1 to about 500, "b" has a value from 0 to about 0.9, "g" is the valence of M, "c" has a value from about 1 to about 60, "d" has a value from 0 to about 0.8c and "e" has a value from about 100 to about 2800.

These and other objects and embodiments will become more apparent after the following detailed description of the invention.

DETAILED DESCRIPTION OF THE INVENTION

As stated, this invention relates to a new family of indium silicate containing microporous compositions and a process for preparing these microporous compositions. The crystalline microporous compositions have a three dimensional framework structure of at least silicon tetrahedral oxide units and indium oxide units. The indium can have a coordination number of 4, 5 or 6. These compositions are described by the following empirical formula:

$$A_p(In_{1-n}M_n)_ySi_{1-z}Ge_zO_x$$

In this formula "A" is a structure directing cation which will also act as a charge balancing cation. These "A" ions are selected from the group consisting of alkali metals, alkaline earth metals, ammonium ion, hydronium ion and mixtures thereof. Specific examples of alkali metals include sodium, potassium and mixtures thereof. Examples of alkaline earth metals are magnesium, calcium, barium and strontium. The value of "p" which is the mole fraction of "A" varies from about 0.5y to about 3y and is chosen so that valence neutrality of the composition is achieved.

A portion of the indium metal can be optionally replaced by an element M present in the framework with "n" being the mole fraction of M and having a value of 0 to about 0.9. The M element is an element with a +3, +4 or a +5 valence. Specific examples of the M elements include without limitation gallium (+3), iron (+3), ruthenium (+3), yttrium (+3), trivalent rare earth elements such as cerium, neodymium, ytterbium and lutetium, titanium (+4), zirconium (+4), cerium (+4) and niobium (+5). The value of y/Si in these multi metallic compositions ranges between 4:1 and 1:1, since M is replacing In in the microporous composition.

Finally, "y" has a value of about 0.25 to about 1, "z" has a value from 0 to about 0.9 and "x" has a value from about 2+y to about 2+5y. When "z" has a value of greater than zero, some of the silicon in the framework has been replaced by germanium.

This new family of indium silicate microporous compositions are prepared by a hydrothermal crystallization of a reaction mixture prepared by combining a reactive source of indium, silicon, optionally germanium, optionally one or more M elements, at least one structure directing cation and water. The indium compounds which can be used are any of those which can be solubilized in the aqueous reaction mixture. Specific examples include, but are not limited to, indium halides, with indium chloride preferred, indium oxide, indium nitrate, indium acetate and indium hydroxide. Silicon sources include without limitation colloidal silica, fumed silica, tetraethylorthosilicate and sodium silicate. The germanium sources include without limitation germanium oxide, germanium alkoxides and germanium tetrachloride. Alkali sources include without limitation potassium hydroxide, sodium hydroxide, rubidium hydroxide, cesium hydroxide, sodium carbonate, potassium carbonate, rubidium carbonate, cesium carbonate, sodium halide, potassium halide, rubidium halide, cesium halide, sodium acetate, potassium acetate, cesium acetate and rubidium acetate. Alkaline earth metal sources include without limitation calcium hydroxide, barium hydroxide, calcium chloride, etc. Finally, the M element sources include without limitation the halide, nitrate and acetate salts as well as oxides and hydrous oxides. Hydrous oxides include high surface area hydrated metal oxides as well as oxyhydroxides.

Generally, the hydrothermal process used to prepare the indium silicate microporous compositions of this invention involves forming a reaction mixture containing reactive sources of the required/desired components. The reaction mixture can be described in terms of molar ratios of the oxides by the formula:

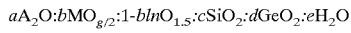

$$aA_2O:bMO_{g/2}:1-bInO_{1.5}:cSiO_2:dGeO_2:eH_2O$$

where "n" has a value from about 1 to about 500, "b" has a value from 0 to about 0.9, "g" is a valence of M, "c" has a value from about 1 to about 60, "d" has a value from 0 to about 0.8c and "e" has a value from about 100 to about 2800. The reaction mixture is prepared by mixing the desired sources of indium, silicon, templating agent, optionally a M element and optionally germanium in any order to give the desired mixture. It is also necessary that the mixture have a pH of at least 10 and preferably from about 12 to about 14. The basicity of the mixture is controlled by adding excess alkali hydroxide and/or basic compounds of the other constituents of the mixture. Having formed the reaction mixture it is next reacted at a temperature of about 100° C. to about 250° C. for a period of about 1 hour to about 14 days in a sealed reaction vessel under autogenous pressure. After the allotted time, the mixture is filtered or centrifuged to isolate the solid product which is washed with deionized water and dried in air.

As stated, the crystalline microporous compositions of this invention have a three dimensional framework structure of $SiO_2$ octahedral units and indium oxide units. The indium can be 4, 5 or 6 coordinate. Optionally the framework can contain tetrahedral $GeO_2$ units and/or 4, 5 or 6 coordinate M oxide units. This framework results in a microporous structure having an intracrystalline pore system with uniform pore diameters, i.e., the pore sizes are crystallographically regular. The diameter of the pores can vary considerably from about 3 Å and larger. Preferably the pore diameter of the compositions are less than 8 Å.

As synthesized, the molecular sieves of this invention will contain some of the structure directing cations in the pores. These metals are described as exchangeable cations meaning that they can be exchanged for other (secondary) cations. Generally, the A exchangeable cations can be exchanged for other alkali metal cations ($K^+$, $Na^+$, $Rb^+$, $Cs^+$), alkaline earth cations ($Mg^{2+}$, $Ca^{2+}$, $Sr^{2+}$, $Ba^{2+}$), hydronium ion, ammonium ion, transition elements having a +2 or +3 valence, rare earth metals having a valence of +2 or +3 and mixtures thereof. The methods used to exchange one cation for another are well known in the art and involve contacting the molecular sieve with a solution containing the desired cation at exchange conditions. Exchange conditions include a temperature of about 25° C. to about 100° C. and a time of about 20 minutes to about 16 hours.

The crystalline compositions of this invention are capable of separating mixtures of molecular species based on the molecular size (kinetic diameters) or on the degree of polarity of the molecular species. When the separation of molecular species is based on molecular size, the crystalline microporous composition is chosen in view of the dimensions of its pores such that at least the smallest molecular species of the mixture can enter the intracrystalline void space while at least the largest species is excluded. The kinetic diameters of various molecules such as oxygen, nitrogen, carbon dioxide, carbon monoxide are provided in D. W. Breck, *Zeolite Molecular Sieves*, John Wiley and Sons (1974), p. 636.

When the separation is based on degree of polarity, it is generally the case that the more hydrophilic crystalline composition of this invention will preferentially adsorb the more polar molecular species of a mixture having different degrees of polarity even though both molecular species can communicate with the pore system of the crystalline material. For example water, which is more polar, will be preferentially adsorbed over common hydrocarbon molecules such as paraffins, olefins, etc. Thus, the crystalline materials of this invention can be used as desiccants in such adsorption separation/purification processes as natural gas drying, cracked gas drying, etc.

To allow for ready reference, the different structure types and compositions of indium silicate microporous compositions have been given arbitrary designations of INSI-1 where the "1" represents a framework of structure type "1". That is, one or more indium silicate microporous composition with different empirical formulas can have the same structure type.

The X-ray patterns presented in the following examples were obtained using standard X-ray powder diffraction techniques. The radiation source was a high-intensity X-ray tube operated at 45 Kv and 35 ma. The diffraction pattern from the copper K-alpha radiation was obtained by appropriate computer based techniques. Flat compressed powder samples were continuously scanned at 2° (2θ) per minute from 2° to 70° (2θ). Interplanar spacings (d) in Angstrom units were obtained from the position of the diffraction peaks expressed as 2θ where θ is the Bragg angle as observed from digitized data. Intensities were determined from the integrated area of diffraction peaks after subtracting background, "$I_o$" being the intensity of the strongest line or peak, and "I" being the intensity of each of the other peaks.

As will be understood by those skilled in the art, the determination of the parameter 2θ is subject to both human and mechanical error, which in combination can impose an uncertainty of about ±0.4 on each reported value of 2θ and up to ±0.5 on reported values for nanocrystalline materials. This uncertainty is, of course, also manifested in the reported values of the d-spacings, which are calculated from the θ values. This imprecision is general throughout the art and is not sufficient to preclude the differentiation of the present crystalline materials from each other and from the compositions of the prior art. In some of the X-ray patterns reported, the relative intensities of the d-spacings are indicated by the notations vs, s, m and w which represent very strong, strong, medium, and weak, respectively. In terms of 100 X $I/I_o$, the above designations are defined as w=0–15; m=15–60; s=60–80 and vs=80–100.

In certain instances the purity of a synthesized product may be assessed with reference to its X-ray powder diffraction pattern. Thus, for example, if a sample is stated to be pure, it is intended only that the X-ray pattern of the sample is free of lines attributable to crystalline impurities, not that there are no amorphous materials present.

EXAMPLE 1

INSI-1

A solution was prepared by mixing 180.2 g KOH in 220.1 g $H_2O$. To this solution were added 106.8 g of colloidal silica (DuPont Corp. identified as Ludox® LS). A second solution was prepared by dissolving 22.1 g $InCl_3.4H_2O$ in 220.4 g $H_2O$. This second solution was added dropwise to the first solution with stirring. The pH of the resultant mixture was 14 and had the composition:

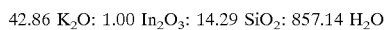

42.86 $K_2O$: 1.00 $In_2O_3$: 14.29 $SiO_2$: 857.14 $H_2O$

The reaction mixture was loaded into polytetrafluoroethylene lined reactors and heated to 200° C. for 120 hours. The reactors were cooled to room temperature and the products were centrifuged to isolate the solids. The solids were washed with 0.01 M KOH solution and dried at 100° C. Elemental analysis showed the solid product to have a formula:

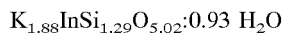

$K_{1.88}InSi_{1.29}O_{5.02}$:0.93 $H_2O$

The X-ray powder diffraction pattern of this product was characterized by the data presented in Table 1. The diffraction peaks for this phase are quite broad, indicating that the product forms as very small crystallites.

TABLE 1

| 2 θ | d (Å) | I |
| --- | --- | --- |
| 5.64 | 15.44 | m |
| 10.44 | 8.68 | m |
| 12.84 | 6.89 | w |
| 16.59 | 5.34 | m |
| 30.36 | 2.94 | vs |

TABLE 1-continued

| 2 θ | d (Å) | I |
| --- | --- | --- |
| 31.64 | 2.83 | m |
| 32.94 | 2.72 | w |
| 40.72 | 2.21 | m |
| 41.80 | 2.12 | w |
| 51.52 | 1.77 | m |
| 53.06 | 1.72 | w |
| 56.94 | 1.61 | m |

Scanning Electron Microscopy (SEM) of a portion of the sample, including EDAX of several crystal aggregates indicated the presence of indium and silicon framework elements.

Adsorption capacities were measured using a standard McBain-Bakr gravimetric apparatus. Data was collected on an as-synthesized portion and a $Mg^{2+}$ exchanged form of this sample after vacuum activation at ~350° C. for 16 hours. The $Mg^{2+}$ version of this INSI-1 sample was prepared using standard aqueous ion exchange conditions. The exchange was carried out using a solution containing a five fold excess of $Mg^{2+}$ ions. The INSI-1 was contacted with the solution at 90° C. for 4 hours, filtered and the process repeated two more times (three batch exchanges total). The exchanged INSI-1 had the following product formula as determined by bulk elemental analysis:

$K_{0.08}Mg_{0.65}InSi_{1.22}O_{4.6}.H_2O$

TABLE 2

| Adsorbate | Kinetic Diameter, Å | Pressure P/P$_o$ | Temp. ° C. | Wt % Adsorbed as syn., ($Mg^{2+}$ exchanged) |
| --- | --- | --- | --- | --- |
| Oxygen | 3.46 | 0.14 | −183° C. | 3.5, (6.6) |
| n-butane | 4.3 | 0.42 | 24 | 3.5, (5.0) |
| iso-butane | 5.0 | 0.3 | 24 | 2.7, (4.0) |
| $H_2O$ | 2.65 | 0.21 | 0 | 4.9, (6.2) |
| $H_2O$ | 2.65 | 0.99 | 24 | 27.2, (25.2) |

The pore size of the as-synthesized INSI-1 product and the Mg exchanged INSI-1 is greater than 5 Å based on the adsorption of iso-butane.

EXAMPLE 2

INSI-1

A solution was prepared by dissolving 59.0 g of KOH in 71.96 g of de-ionized water. To this solution were added 34.92 g of colloidal silica (DuPont Corp. identified as Ludox® LS-30) slowly with stirring. This was followed by the dropwise addition of a pre-mixed solution of 7.15 g $InCl_3.4H_2O$ (Aldrich 97%) dissolved in 72.55 g de-ionized $H_2O$. The resultant reaction mixture had a composition of:

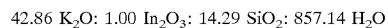

42.86 $K_2O$: 1.00 $In_2O_3$: 14.29 $SiO_2$: 857.14 $H_2O$

The reaction mixture was split into 6 aliquots and reacted under autogeneous pressure both quiescently and tumbled in an oven equipped with a rotisserie rack for 48, 72 and 120 hours at 200° C. After the reaction was complete, the solids were isolated by centrifugation, washed with water and dried at 60° C. The x-ray powder diffraction pattern of the product from the quiescent 48 hours at 200° C. digestion was characterized by the data presented in Table 3. The diffraction peaks for this phase are quite broad, indicating that the product forms as very small crystallites.

TABLE 3

| 2 θ | d (Å) | I |
|---|---|---|
| 5.55 | 15.92 | vs |
| 10.43 | 8.48 | m |
| 12.68 | 6.98 | m |
| 16.56 | 5.35 | m |
| 30.36 | 2.94 | vs |
| 31.43 | 2.84 | m |
| 33.14 | 2.70 | m |
| 40.80 | 2.21 | w |
| 41.92 | 2.15 | w |
| 51.62 | 1.77 | m |
| 53.04 | 1.73 | w |
| 57.11 | 1.61 | m |

The products from the other reaction conditions showed X-ray diffraction patterns substantially the same as the one in Table 3. Scanning electron microscopy (SEM) of a portion of the sample that was prepared by quiescent digestion for 48 hours at 200° C., including EDAX of several crystal aggregates indicated the presence of indium and silicon framework elements. TEM analysis of this same sample demonstrated that the INSI-1 material is nanocrystalline. Individual crystallites can be as thin as ~6 nm. The pore size measured by TEM microscopy is consistent with that measured by McBain techniques.

EXAMPLE-3

INSI-2

Colloidal silica (44.85 g of DuPont Corp., Ludox® LS-30) was added slowly to a stirring mixture of 93.18 g $K_2CO_3$ in 210.28 g of de-ionized $H_2O$. When the addition was complete a solution of 9.26 g $InCl_3.4H_2O$ dissolved in 80.07 g de-ionized $H_2O$ was added dropwise to the stirring $SiO_2/K_2CO_3$ solution. The reaction mixture had the empirical formula of:

42.86 $K_2O$: 1.0 $In_2O_3$: 14.29 $SiO_2$: 1142.8 $H_2O$

The reaction mixture was stirred vigorously for one hour, split into two portions loaded into autoclaves and reacted for 120 hours at 225° C. both quiescently and stirred. At the end of the reaction time, the mixtures were vacuum filtered, the solids washed with de-ionized water and dried in ambient air. Chemical analysis of the stirred product indicated the presence of 15.3 wt % K, 15.4 wt % In, 29.5 wt % Si, 6.31% LOI giving a product formula of:

$K_{2.92}InSi_{7.84}O_{18.64}.0.35 H_2O$

By x-ray analysis the solids were found to be an admixture of phases, with the predominant phase (>70%) identified as INSI-2 and represented by the data in Table 4.

A quartz phase ($SiO_2$) was identified as a impurity present in this sample.

TABLE 4

| 2 θ | d (Å) | I |
|---|---|---|
| 6.31 | 14.25 | w |
| 9.22 | 9.58 | m |

TABLE 4-continued

| 2 θ | d (Å) | I |
|---|---|---|
| 16.46 | 5.38 | m |
| 21.20 | 4.19 | m |
| 24.20 | 3.67 | m |
| 27.04 | 3.29 | vs |
| 29.44 | 3.03 | w |
| 33.42 | 2.68 | m |
| 43.22 | 2.09 | m |

Scanning Electron Microscopy (SEM) of a portion of the sample showed several different crystal morphologies present. EDAX analysis of the crystals thought to be the INSI-2 phase indicated the presence of indium and silicon framework elements. Other silicon rich crystals (by EDAX) may be representative of the quartz impurity phase present in the x-ray powder pattern.

EXAMPLE 4

INSI-3

A solution was prepared by dissolving 343.84 g of KOH (87.8%) in 572.17 g de-ionized water. Then, 417.63 g of colloidal silica (Ludox®) was added to the resulting solution with stirring from a high speed mixer. To the resulting solution, 85.58 g of $InCl_3.4H_2O$ dissolved in 180.76 g de-ionized water was added dropwise with mixing. The slurry was mixed for approximately 2.5 hours then transferred to a blender and homogenized for 1 minute. The final pH was 14 with a resulting gel composition of:

21 $K_2O:In_2O_3$: 14.29 $SiO_2$:423.5 $H_2O$

The reaction mixture was transferred to a polytetrafluoroethylene lined reactor and heated for 3 days at 225° C. The resulting solid reaction product was isolated by filtration, washed with de-ionized water and dried at room temperature. Chemical analysis of this product revealed the presence of 41.0 wt % In, 17.0 wt % K, and 14.0 wt % Si, 15.56% LOI, which gave a formula of $K_{1.22}InSi_{1.40}O_{4.90}.2.86H_2O$. The X-ray powder diffraction pattern of this product, which contained approximately less than 10% of an unknown crystalline impurity, was characterized by the data presented in Table 5.

TABLE 5

| 2 θ | d (Å) | I |
|---|---|---|
| 5.66 | 15.61 | vs |
| 9.80 | 9.02 | m |
| 19.50 | 4.55 | w |
| 22.80 | 3.89 | m |
| 26.64 | 3.34 | w |
| 27.26 | 3.27 | w |
| 28.59 | 3.12 | w |
| 29.16 | 3.06 | w |
| 29.76 | 3.00 | w |
| 31.40 | 2.85 | w |
| 31.88 | 2.80 | m |
| 34.40 | 2.60 | w |
| 35.38 | 2.53 | w |
| 37.81 | 2.38 | w |

Adsorption capacities were measured on a portion of this sample using a standard Mc Bain-Bakr gravimetric apparatus. The following data was obtained on a sample activated in vacuum at about 350° C.:

TABLE 6

| Adsorbate | Kinetic Diameter, Å | Pressure P/P$_o$ | Temp. °C. | Wt % Adsorbed |
|---|---|---|---|---|
| Oxygen | 3.46 | 0.14 | −183 | 1.13 |
| Oxygen | 3.46 | 0.95 | −183 | 1.76 |
| n-butane | 4.3 | 0.42 | 25 | 1.70 |
| iso-butane | 5.0 | 0.3 | 25 | 1.45 |
| H$_2$O | 2.65 | 0.21 | 0 | 8.28 |
| H$_2$O | 2.65 | 0.8 | 25 | 24.94 |

EXAMPLE 5

INSI-4

439.89 g KOH with 266.51 g colloidal silica (Ludox® LS-30) was intermittently added to 68.35 g of de-ionized water with stirring using a high speed mixer. To this solution, 54.63 g InCl$_3$.4H$_2$O dissolved in 21.57 g de-ionized water was added dropwise with mixing. The slurry mixed for approximately 2 hours. The final solution pH was 14 with a gel composition of:

$$In_2O_3:42K_2O:14.29\ SiO_2:211.75\ H_2O$$

The reaction mixture was placed in a stirred reactor and heated to 200° C. for 3 days. After this time, the solid was isolated by filtration, washed and dried in air at room temperature. Elemental analysis revealed the presence of 24.1 wt % In, 27.2 wt. % K, and 17.8 wt. % Si, 7.11 wt % LOI, which gave a formula of K$_{3.32}$InSi$_{3.02}$O$_{9.20}$.2.0 H$_2$O. The X-ray powder diffraction pattern of this product, which contained a minor amount of an unknown crystalline impurity, was characterized by the data presented in Table 7.

TABLE 7

| 2 θ | d (Å) | I |
|---|---|---|
| 13.20 | 6.70 | m |
| 13.82 | 6.40 | vs |
| 15.30 | 5.79 | m |
| 19.10 | 4.64 | m |
| 21.56 | 4.12 | m |
| 25.24 | 3.52 | m |
| 26.50 | 3.36 | m |
| 26.80 | 3.32 | m |
| 27.76 | 3.21 | w |
| 28.54 | 3.12 | m |
| 29.17 | 3.06 | m |
| 30.80 | 2.90 | s |
| 31.60 | 2.83 | m |
| 32.70 | 2.74 | m |
| 34.70 | 2.58 | m |
| 37.88 | 2.37 | m |
| 42.66 | 2.12 | s |
| 46.90 | 1.94 | m |
| 49.44 | 1.84 | m |

EXAMPLE 6

INSI-5

To 158.65 g of de-ionized water, 826.24 g KOH was added alternately with 501.68 g colloidal silica (30 wt %) while stirring with a high speed mixer. To the resulting solution, 102.82 g of InCl$_3$.4H$_2$O dissolved in 10.62 g de-ionized water was added dropwise with mixing. The resulting slurry was mixed for approximately 2.5 hours. The final solution pH was 14 with a gel composition of:

$$In_2O_3:42K_2O:14.29\ SiO_2:211.75H_2O$$

The reaction mixture was transferred to a polytetrafluoroethylene-lined quiescent reactor and heated for 3.75 days at 225° C. The solid product was isolated and washed by centrifugation and dried at 100° C. for 3 days. Chemical analysis of this product revealed the presence of 45.0% In, 13.2% K, 13.9% Si, 6.64% LOI, which gave a formula of K$_{0.82}$InSi$_{1.26}$O$_{4.46}$.1.01 H$_2$O. The X-ray powder diffraction pattern of this product, which contained some crystalline INSI-1, was characterized by the data presented in Table 8.

TABLE 8

| 2 θ | d (Å) | I |
|---|---|---|
| 6.40 | 13.80 | vs |
| 17.22 | 5.14 | w |
| 17.80 | 4.98 | w |
| 19.32 | 4.59 | w |
| 24.74 | 3.60 | m |
| 25.88 | 3.44 | s |
| 26.70 | 3.34 | w |
| 32.48 | 2.75 | w |
| 32.92 | 2.72 | w |
| 34.94 | 2.57 | w |
| 37.32 | 2.41 | w |
| 39.24 | 2.29 | w |
| 42.58 | 2.12 | m |

EXAMPLE 7

INSI-6

A solution was prepared by dissolving 91.51 g KOH in 30.00 g of de-ionized water followed by the addition of 108.00 g of colloidal silica (Ludox® LS). A pre-mixed solution of 10.60 g InCl$_3$.4H$_2$O dissolved in 10.20 g de-ionized water was then added dropwise while stirring to the aqueous potassium silicate solution. After 2 hours of stirring, the pH of the resultant clear slightly yellow solution was 14 and had an empirical formula:

$$85.72\ K_2O:1.34\ In_2O_3:57.16\ SiO_2:857.14\ H_2O$$

The reaction mixture was loaded into seven 45 ml polytetrafluoroethylene lined reactors and heated to 225° C. for 120 hours. The reactors were cooled to room temperature, opened and combined to yield one sample. The solid products were isolated and washed by vacuum filtration and dried in ambient air. Elemental analysis showed the product to have a formula:

$$K_{2.73}InSi_{2.76}O_{8.39}.1.85\ H_2O$$

The x-ray powder pattern of this product, which contained approximately less than 10% INSI-1 as an impurity, was characterized by the data presented in Table 9.

TABLE 9

| 2 θ | d (Å) | I |
|---|---|---|
| 12.70 | 6.96 | s |
| 13.89 | 6.38 | m |
| 15.36 | 5.76 | m |
| 16.88 | 5.25 | w |
| 18.86 | 4.70 | w |
| 19.98 | 4.44 | w |

TABLE 9-continued

| 2 θ | d (Å) | I |
|---|---|---|
| 20.32 | 4.36 | w |
| 20.76 | 4.27 | w |
| 21.18 | 4.19 | w |
| 24.42 | 3.64 | w |
| 25.56 | 3.48 | m |
| 26.02 | 3.42 | w |
| 27.96 | 3.19 | w |
| 29.06 | 3.07 | m |
| 29.98 | 2.98 | w |
| 30.80 | 2.90 | s |
| 31.04 | 2.88 | vs |
| 31.84 | 2.81 | m |
| 33.16 | 2.70 | w |
| 34.40 | 2.60 | m |
| 37.70 | 2.38 | w |
| 41.28 | 2.19 | w |
| 41.94 | 2.15 | w |
| 42.52 | 2.12 | m |
| 44.56 | 2.03 | w |
| 46.14 | 1.97 | w |
| 47.32 | 1.92 | w |
| 49.46 | 1.84 | w |
| 51.02 | 1.79 | w |
| 52.54 | 1.74 | w |
| 64.72 | 1.44 | m |

EXAMPLE 8

INSI-7

A solution was prepared by dissolving 32.0 g of NaOH in 95.1 g de-ionized water. To this, 23.9 g of colloidal silica (Ludox® LS-30) was added slowly with stirring. This was followed by the dropwise addition of a pre-mixed solution of 8.2 g of $InCl_3 \cdot 4 H_2O$ in 95.1 g de-ionized water. The resulting mixture had a pH of 13.4 and an empirical formula:

$$28.57\ Na_2O : 1.00\ In_2O_3 : 8.57\ SiO_2 : 857.14\ H_2O$$

The reaction mixture was divided into 9 aliquots and crystallized under autogenous pressure for 24, 72 and 168 hours at 150, 200 and 225° C. The solid products were isolated and washed by vacuum filtration and dried in ambient air. The product from the 168 hours digestion at 150° C. is representative of INSI-7, characterized by the data presented in Table 10.

TABLE 10

| 2 θ | d (Å) | I |
|---|---|---|
| 7.35 | 12.02 | vs |
| 10.31 | 8.57 | w |
| 12.56 | 7.04 | w |
| 15.05 | 5.88 | w |
| 16.91 | 5.24 | w |
| 22.09 | 4.02 | w |
| 25.12 | 3.54 | w |
| 29.61 | 3.01 | m |
| 37.13 | 2.42 | w |

The product of the reaction at 200° C. for 72 hours had a substantially similar X-ray diffraction pattern.

EXAMPLE 9

INSI-8

To a solution of 21.6 g NaOH dissolved in 108.5 g de-ionized water, 26.9 g of colloidal silica (Ludox® LS-30) were added slowly with stirring. After 0.5 hours of vigorous stirring, a pre-mixed solution of 9.4 g $InCl_3 \cdot 4H_2O$ in 108.6 g de-ionized water was added dropwise while stirring. The resultant mixture had a pH of 13.2 and the following composition:

$$16.1\ Na_2O : 1.00\ In_2O_3 : 8.57\ SiO_2 : 857.14\ H_2O$$

The reaction mixture was divided into 9 aliquots and reacted quiescently under autogeneous pressure for 24, 72 and 168 hours at 150, 200, and 225° C. The reactors were cooled to room temperature and the mixtures were vacuum filtered to isolate the solid products, washed with de-ionized water and dried in ambient air. The products from the 168 hour reaction at 200° C. were analyzed by X-ray powder diffraction. The major component of the product displayed the diffraction lines shown in Table 11.

TABLE 11

| 2 θ | d (Å) | I |
|---|---|---|
| 8.02 | 11.02 | vs |
| 15.16 | 5.84 | w |
| 15.98 | 5.54 | w |
| 16.76 | 5.28 | w |
| 17.90 | 4.95 | w |
| 18.94 | 4.68 | m |
| 24.12 | 3.69 | w |
| 24.90 | 3.57 | w |
| 25.74 | 3.46 | m |
| 28.34 | 3.15 | m |
| 29.62 | 3.01 | m |
| 30.49 | 2.93 | w |
| 30.74 | 2.91 | w |
| 32.02 | 2.79 | m |
| 32.32 | 2.77 | m |
| 34.48 | 2.60 | w |
| 42.14 | 2.14 | w |

EXAMPLE 10

INSI-8

A solution was prepared of 41.9 g NaOH in 45.0 g de-ionized water to which 139.5 g colloidal silica (Ludox® LS-30) were added slowly while stirring. After the addition was complete, a pre-mixed solution of 10.6 g $InCl_3 \cdot 4H_2O$ in 62.7 g de-ionized water was added dropwise with stirring. After vigorous stirring for 1 hour, the resultant mixture had a pH of 12.9 and an empirical formula of:

$$42.86\ Na_2O : 1.00\ In_2O_3 : 57.16\ SiO_2 : 1000\ H_2O$$

The reaction mixture was divided into 9 separate portions and reacted under autogeneous pressure for 24, 72 and 168 hours at 150, 200 and 225° C. After these times, the reactors were cooled to room temperature and the mixtures were vacuum filtered to isolate solid products which were washed with de-ionized water and dried in room air.

The product reacted at 225° C. for 3 days had a substantially similar X-ray diffraction pattern to Table 12. It was analyzed and found to contain 12.9 mass % Na, 25.1 mass % In, 24.5 mass % Si with 9.14% LOI giving a product composition of:

$$Na_{2.56}InSi_{3.98}O_{10.74} \cdot 0.51\ H_2O$$

The solid reaction product reacted for 168 hours at 225° C. also had an X-ray powder diffraction pattern substantially similar to Table 11. Adsorption capacities were measured using a standard McBain-Bakr gravimetric apparatus. The following data was obtained on a sample activated in vacuum for 16 hours at ~350° C.:

TABLE 12

| Adsorbate | Kinetic Diameter, Å | Pressure $P/P_o$ | Temp. °C. | Wt % Adsorbed |
|---|---|---|---|---|
| Oxygen | 3.46 | 0.13 | −183 | 1.35 |
| Oxygen | 3.46 | 0.92 | −183 | 2.29 |
| n-butane | 4.3 | 0.39 | 25 | 0.69 |
| $H_2O$ | 2.65 | 0.21 | 0 | 9.06 |
| $H_2O$ | 2.65 | 0.95 | 25 | 14.56 |

The pore size of the as-synthesized INSI-8 product is at least 3.46 Å based on the adsorption of oxygen.

EXAMPLE 11

Preparation of a mixed cation Na/K—In—Si—O (INSI-9)

A solution was prepared by dissolving 29.51 g of KOH (87.8%) in 86.03 g deionized water. To this solution there were added 7.01 g of NaOH (97%). Next, 47.72 g of colloidal silica (30 wt. %) was added to the resulting solution with stirring. To the resulting solution, 9.78 g of $InCl_3.4H_2O$ dissolved in 20.67 g deionized water was added dropwise with mixing. The slurry was mixed for approximately 2.5 hours. The final mixture had a pH of 14 and the following composition:

$In_2O_3:15.75K_2O:5.25\ Na_2O:14.29SiO_2:423.5H_2O$

A portion of the reaction mixture was transferred to a Teflon lined quiescent reactor and heated for 7 days at 225° C. The solid products were isolated by centrifuging and then dried at 100° C. overnight. Chemical analysis of this product revealed the presence of 29.7 wt % In, 5.03 wt % K, 8.63 wt % Na, and 21.8 wt % Si, 7.43% LOI, which gave a formula of $K_{0.50}Na_{1.45}InSi_{3.00}O_{8.48} \cdot 1.73H_2O$. The X-ray powder diffraction pattern of this product, which contained less than 10% of an impurity, was characterized by the data presented in Table 13.

TABLE 13

| 2 θ | d (A) | I |
|---|---|---|
| 7.96 | 11.10 | vs |
| 14.62 | 6.05 | m |
| 15.02 | 5.89 | m |
| 15.90 | 5.57 | w |
| 16.70 | 5.30 | m |
| 17.80 | 4.98 | w |
| 18.84 | 4.71 | m |
| 24.12 | 3.69 | m |
| 24.80 | 3.59 | w |
| 25.68 | 3.47 | m |
| 28.29 | 3.15 | m |
| 29.46 | 3.03 | s |
| 30.29 | 2.95 | m |
| 31.66 | 2.82 | m |
| 31.99 | 2.80 | s |
| 32.36 | 2.76 | m |
| 35.68 | 2.51 | w |
| 44.40 | 2.04 | w |
| 50.24 | 1.82 | w |

EXAMPLE 12

INSI-10

A solution was prepared by dissolving 80.62 g of $Na_2CO_3 \cdot H_2O$ in 193.82 g de-ionized water. To this, 64.92 g colloidal silica (Ludox® LS-30) were added slowly while stirring. When this addition was complete, a premixed solution of 13.33 g $InCl_3.4\ H_2O$ dissolved in 96.86 g de-ionized water was added slowly while stirring. After vigorous stirring for one hour, the resultant mixture had a pH of 9.82 and a reaction mixture composition of:

$28.57\ Na_2O: 1.00\ In_2O_3: 14.29\ SiO_2: 857.14\ H_2O$

The resulting mixture was transferred to a stirred autoclave reactor and hydrothermally treated for 72 hours at 225° C. After this time, the reactor was cooled to room temperature and the solids were isolated and washed with de-ionized water. The solid reaction product was analyzed and found to contain 7.92 wt % Na, 18.0 wt % In, 31.5 wt % Si with a 9.96 wt % LOI giving a product formula of $Na_{2.20}InSi_{7.20}O_{17} \cdot 3.52\ H_2O$. Scanning Electron Microscopy (SEM) of a portion of the sample, including several crystal aggregates, indicated the presence of indium and silicon framework elements. The x-ray powder diffraction pattern of the INSI-10 product, which contained about 20–30% quartz impurity was characterized by the data displayed in Table 14.

TABLE 14

| 2 θ | d (Å) | I |
|---|---|---|
| 6.14 | 14.38 | vs |
| 15.54 | 5.70 | w |
| 16.74 | 5.29 | m |
| 20.18 | 4.39 | m |
| 21.94 | 4.05 | w |
| 24.26 | 3.66 | m |
| 29.39 | 3.04 | w |
| 31.77 | 2.81 | w |
| 34.56 | 2.59 | w |
| 52.04 | 1.76 | w |

A portion of the sample was partially $Mg^{2+}$ exchanged following standard zeolitic ion exchange procedure ( 3 fold exchange for 4 hours at 95° C. using 5 times excess $Mg^{2+}$). Analysis of this product gave a formula of $Na_{1.39}Mg_{0.42}InSi_{6.91}O_{16.44} \cdot 4.36\ H_2O$. Adsorption capacities for this $Mg^{2+}$ exchanged INSI-10 product were measured using a standard McBain-Bakr gravimetric apparatus. The following data was obtained on a sample activated in vacuum for 16 hours at ~350° C:

TABLE 15

| Adsorbate | Kinetic Diameter, Å | Pressure $P/P_o$ | Temp. °C. | Wt % Adsorbed |
|---|---|---|---|---|
| Oxygen | 3.46 | 0.13 | −183 | 5.73 |
| Oxygen | 3.46 | 0.92 | −183 | 9.61 |
| n-butane | 4.3 | 0.39 | 25 | 10.12 |
| $H_2O$ | 2.65 | 0.21 | 0 | 7.31 |
| $H_2O$ | 2.65 | 0.95 | 25 | 21.56 |

The pore size of the partially $Mg^{2+}$ exchanged INSI-10 sample is at least 4.3 Å as evidenced by the adsorption of n-butane.

EXAMPLE 13

Preparation of a K—Fe—In—Si—O (INSI-1)

A solution was prepared by dissolving 94.26 gm of KOH in 200 gm de-ionized water with stirring. 57.24 g of colloidal silica (Ludox® LS -30) was added to the resulting solution with stirring from a high speed mixer. To the resulting solution, 0.35 g ferric chloride and 2.21 g $InCl_3 \cdot 4H_2O$ was dissolved in 51 g de-ionized water and was added drop-wise to the stirring $KOH/SiO_2$ solution. A clear yellow solution resulted with a final pH of 14 and a resulting gel composition of:

$$0.0875\ Fe_2O_3: 0.525\ HCl: 0.26\ In_2O_3: 14.7\ K_2O: 5\ SiO_2: 300\ H_2O$$

The reaction mixture was transferred into 6 Teflon lined quiescent reactors and heated for 1–3 days at 150–225° C. The resulting solid reaction products were isolated by filtration, washed with deionized water and dried at room temperature. Chemical analysis of the product heated at 200° C. for 24 hours revealed the presence of 44.3 wt % In, 10.8 wt % K, and 11.5 wt % Si, and 1.34 wt % Fe which gave a formula of $K_{0.66}InFe_{0.6}Si_{1.34}O_{5.41} \cdot XH_2O$. The X-ray powder diffraction pattern of this product was characterized by the data presented in Table 16. The diffraction peaks for this phase are quite broad, indicating that the product forms as very small crystallites. The product was also examined by SEM EDAX, which indicated that iron was incorporated into the framework.

TABLE 16

| 2 θ | d (A) | I |
|---|---|---|
| 6.118 | 14.4346 | vs |
| 10.52 | 8.4022 | s |
| 12.481 | 7.0862 | m |
| 16.286 | 5.438 | w |
| 17.805 | 4.9775 | w |
| 20.594 | 4.3093 | w |
| 25.162 | 3.5363 | m |
| 30.282 | 2.949 | s |
| 31.642 | 2.8254 | vs |
| 33.241 | 2.693 | m |
| 34.877 | 2.5703 | w |
| 41.035 | 2.1977 | w |
| 42.003 | 2.1493 | w |
| 42.68 | 2.1167 | m |
| 51.521 | 1.7723 | m |
| 53.197 | 1.7204 | w |
| 57.157 | 1.6102 | m |
| 57.399 | 1.604 | w |

EXAMPLE 14

INSI-11

A solution was prepared by dissolving 1.36 g $CaCl_2$: 2 $H_2O$ in 41.06 g de-ionized water. Next, a pre-mixed solution of 2.74 g $InCl_3 \cdot 4H_2O$ dissolved in 5.23 g de-ionized water was added to the calcium chloride solution. To the resultant clear solution 5.60 g Ludox® LS-30 was then added drop-wise while stirring. This was followed by the addition of 18.80 g 25 wt. % aqueous TMAOH (tetramethylammonium hydroxide) to raise the pH to >13. The resulting reaction mixture had the following composition:

$$5.54\ TMAOH: 1.0\ CaO: 0.5\ In_2O_3: 3.0\ SiO_2: 384\ H_2O$$

The mixture was loaded into a capped Teflon-lined 125 ml Parr reactor and digested quiescently for 72 hours at 200° C. The solid product was isolated and washed by vacuum filtration and dried in ambient air. The product was analyzed and found to contain 8.9 wt. % Ca, 34.0 wt. % In, 21.6 wt. % Si and 17.8% LOI which gives a product formula of:

$$Ca_{0.74}InSi_{2.56}O_{8.86} \cdot 3.3\ H_2O$$

The X-ray powder diffraction of the product is characterized by the data shown in Table 17.

TABLE 17

| 2 θ | d (Å) | I |
|---|---|---|
| 8.72 | 10.13 | s |
| 17.52 | 5.06 | vs |
| 23.28 | 3.82 | m |
| 26.36 | 3.38 | w |
| 27.84 | 3.20 | w |
| 30.62 | 2.91 | m |
| 31.86 | 2.81 | s |
| 35.50 | 2.53 | m |
| 37.72 | 2.38 | w |
| 40.86 | 2.21 | w |
| 44.79 | 2.02 | m |
| 47.63 | 1.91 | w |
| 49.31 | 1.85 | w |
| 54.44 | 1.68 | w |
| 55.27 | 1.66 | m |
| 57.54 | 1.60 | w |

We claim as our invention:

1. A crystalline microporous composition having a three dimensional framework structure of at least silicon tetrahedral oxide units and indium octahedral oxide units and having an empirical formula on an anhydrous basis of:

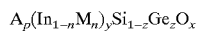

$$A_p(In_{1-n}M_n)_ySi_{1-z}Ge_zO_x$$

where A is a cation selected from the group consisting of alkali metals, alkaline earth metal, ammonium ion, hydronium ion and mixtures thereof, "p" is the mole fraction of A and varies from about 0.5y to about 3y, M is an element having a valence of +3, +4 or +5, "n" is the mole fraction of M and varies from 0 to about 0.9, "x" has a value from about 2+y to about 2+5y, "y" has a value of about 0.25 to about 1 and "z" has a value from 0 to about 0.9.

2. The composition of claim 1 where A is an alkali metal selected from the group consisting of potassium, sodium, and mixtures thereof.

3. The composition of claim 1 further characterized in that the A cation has been exchanged for a secondary cation selected from the group consisting of alkali metal ions, alkaline earth metal ions, hydronium ion, ammonium ion, a transition element having a valence of +2 or +3, a rare earth element having a valence of +2 or +3, and mixtures thereof.

4. The composition of claim 1 where M is selected from the group consisting of gallium (+3), iron (+3), ruthenium (+3), a rare earth element having a +3 valence, yttrium (+3), titanium (+4), zirconium (+4) and niobium (+5).

5. The composition of claim 4 where M is a rare earth metal selected from the group consisting of cerium, neodymium, ytterbium, and lutetium.

6. A process for preparing a crystalline microporous composition having a three dimensional framework structure of at least silicon tetrahedral oxide units and indium octahedral oxide units and having an empirical formula on an anhydrous basis of:

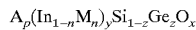

$$A_p(In_{1-n}M_n)_ySi_{1-z}Ge_zO_x$$

where A is a cation selected from the group consisting of alkali metals, alkaline earth metal, ammonium ion and hydronium ion, "p" is the mole fraction of A and varies from about 0.5y to about 3y, M is an element having a valence of +3, +4 or +5, "n" is the mole fraction of M and varies from 0 to about 0.9, "x" has a value from about 2+y to about 2+5y, "y" has a value of about 0.25 to about 1 and "z" has a value from 0 to about 0.9, the process comprising maintaining a reaction mixture containing reactive sources of A, indium, silicon, optionally germanium and optionally M, at a temperature and a for time sufficient to form the crystalline composition, the mixture having a composition expressed in terms of mole ratios of oxides of:

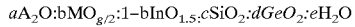

where "a" has a value from about 1 to about 500, "b" has a value from 0 to about 0.9, "g" is the valence of M, "c" has a value from about 1 to about 60, "d" has a value from 0 to about 0.8c and "e" has a value from about 100 to about 2800.

7. The process of claim 6 further characterized in that the A cation is exchanged for a secondary cation selected from the group consisting of alkali metal ions, alkaline earth metal ions, hydronium ion, ammonium ion, a transition element having a valence of +2 or +3, a rare earth element having a valance of +2 or +3, and mixtures thereof by contacting the composition with a solution containing at least one of said secondary cation at exchange conditions thereby exchanging the A cation for the secondary cation.

8. The process of claim 7 where the exchange conditions are a temperature of about 25° C. to about 100° C. and a time of about 20 minutes to about 2 hours.

9. The process of claim 6 where the temperature varies from about 100° C. to about 250° C. and the time varies from about 1 to about 30 days.

10. The process of claim 6 where the indium source is selected from the group consisting of indium halides, indium oxide, indium nitrate, indium acetate and indium hydroxide.

11. The process of claim 6 where the silicon source is selected from the group consisting of colloidal silica, fumed silica, tetraethylorthosilicate and sodium silicate.

12. The process of claim 6 where the alkali metal source is selected from the group consisting of halide, acetate, carbonate and hydroxide compounds of the alkali metals.

13. The process of claim 6 where the M source is selected from the group consisting of metal halides, metal nitrates, metal acetates, metal oxides and metal hydrous oxides.

14. The process of claim 6 where the germanium source is selected from the group consisting of germanium oxide, germanium alkoxides and germanium tetrachloride.

15. A crystalline microporous composition having a three dimensional framework structure of at least silicon tetrahedral oxide units and indium oxide units and having an empirical formula on an anhydrous basis of:

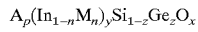

where A is a cation selected from the group consisting of alkali metals, alkaline earth metal, ammonium ion, hydronium ion and mixtures thereof, "p" is the mole fraction of A and varies from about 0.5y to about 3y, M is an element having a valence of +3, +4 or +5, "n" is the mole fraction of M and varies from 0 to about 0.9, "x" has a value from about 2+y to about 2+5y, "y" has a value of about 0.25 to about 1 and "z" has a value from 0 to about 0.9 and characterized in that it has an x-ray powder diffraction pattern which contains the d-spacings and intensities in one of the following Tables 1, 3–5, 7–11, 13, 14,16 and 17.

16. The composition of claim 15 where A is an alkali metal selected from the group consisting of potassium, sodium, and mixtures thereof.

17. The composition of claim 15 further characterized in that the A cation has been exchanged for a secondary cation selected from the group consisting of alkali metal ions, alkaline earth metal ions, hydronium ion, ammonium ion, a transition element having a valence of +2 or +3, a rare earth element having a valence of +2 or +3, and mixtures thereof.

18. The composition of claim 15 where M is selected from the group consisting of gallium (+3), iron (+3), ruthenium (+3), a rare earth element having a +3 valence, yttrium (+3) titanium (+4), zirconium (+4) and niobium (+5).

19. The composition of claim 18 where is a rare earth metal selected from the group consisting of cerium, neodymium, ytterbium, and lutetium.

* * * * *